United States Patent
Pittard

[19]

[11] Patent Number: 6,039,107

[45] Date of Patent: Mar. 21, 2000

[54] VEHICLE WINDOW SHADE ASSEMBLY

[76] Inventor: Michael L. Pittard, 11921 Fox Glen Rd., Charlotte, N.C. 28269

[21] Appl. No.: 09/250,046

[22] Filed: Feb. 12, 1999

[51] Int. Cl.[7] ....................................................... B60J 3/02
[52] U.S. Cl. ......................... 160/370.22; 160/24; 160/265
[58] Field of Search ................................. 160/370.22, 24, 160/290.1, 265; 296/97.7, 97.8, 142, 143

[56] References Cited

U.S. PATENT DOCUMENTS

| | | |
|---|---|---|
| 1,929,314 | 10/1933 | Ishii . |
| 1,964,205 | 6/1934 | Johnson ............................... 160/265 X |
| 2,547,373 | 4/1951 | Camp . |
| 2,594,386 | 4/1952 | Blessen . |
| 3,183,033 | 5/1965 | Stulbach ............................. 296/97.7 X |
| 4,762,358 | 8/1988 | Levosky et al. ................ 160/370.22 X |
| 4,823,859 | 4/1989 | Park . |
| 4,874,026 | 10/1989 | Worrall ........................... 160/370.22 X |
| 4,898,224 | 2/1990 | Woodworth ......................... 160/265 X |
| 4,953,609 | 9/1990 | Annin et al. ............................... 160/24 |
| 5,016,937 | 5/1991 | White ..................................... 296/97.7 |
| 5,044,686 | 9/1991 | Acenbrack . |
| 5,064,238 | 11/1991 | Mohtasham . |
| 5,156,433 | 10/1992 | Decker . |
| 5,172,745 | 12/1992 | Wang .................................. 160/265 X |
| 5,562,144 | 10/1996 | Ming-Shun ........................ 160/370.22 |
| 5,575,524 | 11/1996 | Cronk ............................. 160/370.22 X |
| 5,653,277 | 8/1997 | Kerner et al. ...................... 160/370.22 |
| 5,660,220 | 8/1997 | Ruan . |

*Primary Examiner*—David M. Purol
*Attorney, Agent, or Firm*—Adams Law Firm, P.A.

[57] ABSTRACT

A vehicle window shade assembly protects the interior of a vehicle from sun damage and excessive heat. The shade assembly includes a flexible protective screen adapted for substantially covering a window of the vehicle. An elongated roller carries the screen and includes an internal winding mechanism for automatically moving the screen from an extended in-use position to a retracted storage position around the roller. A mounting assembly is provided for mounting the roller proximate a first edge of the vehicle window. A pull cord is attached to an end of the screen and is adapted for extending from the first edge of the vehicle window to an opposing second edge of the vehicle window with the screen in the retracted storage position. An attachment clip is mounted to the vehicle proximate the second edge of the vehicle window for holding the pull cord. Upon pulling a free end of the pull cord in a direction towards the first edge of the vehicle window, the screen moves from the retracted storage position to the extended in-use position substantially covering the vehicle window.

17 Claims, 5 Drawing Sheets

VEHICLE WINDOW SHADE ASSEMBLY

TECHNICAL FIELD AND BACKGROUND OF THE INVENTION

This invention relates to a vehicle window shade assembly for protecting the interior of a vehicle from sun damage and excessive heat. The invention is applicable for use in any type vehicle, such as automobiles and boats, is relatively inexpensive, and is quickly and easily installed by the vehicle owner. The invention includes a thin pull cord conveniently positioned for ready access by the user, and a roller housing inconspicuously mounted on the dash of the vehicle adjacent a bottom edge of the windshield.

According to one prior art device described in U.S. Pat. No. 5,064,238, a vehicle sunshade is carried on a roller supported at the top of the front windshield, and includes a puller which extends around a mounting arm of the rearview mirror. The puller is used for moving the shade vertically downward towards the dash of the vehicle. In order to accommodate the mounting arm of the rearview mirror, the shade is separated into two spaced-apart sections, thus allowing added sunlight into the interior of the vehicle. Moreover, because of the typical outwardly sloping angle of the front windshield, the prior art sunshade is generally ineffective for protecting the dash of the vehicle when pulled vertically downward.

The present invention overcomes these and other problems of the prior art by providing a vehicle window shade which substantially covers the front windshield when in an extended, in-use position. Unlike the prior art device described above, the invention mounts directly to the dash of the vehicle and is pulled upwardly at a slight angle towards the rearview mirror to better follow the contour of front windshield.

SUMMARY OF THE INVENTION

Therefore, it is an object of the invention to provide a vehicle window shade assembly which substantially covers the front windshield of the vehicle when in an extended in-use position.

It is another object of the invention to provide a vehicle window shade assembly which mounts directly to the dash of the vehicle.

It is another object of the invention to provide a vehicle window shade assembly which includes a convenient pull cord located for ready access by a user.

It is another object of the invention to provide a vehicle window shade assembly which is relatively inconspicuous.

It is another object of the invention to provide a vehicle window shade assembly which is relatively inexpensive and easy to install.

These and other objects of the present invention are achieved in the preferred embodiments disclosed below by providing a vehicle window shade assembly for protecting the interior of a vehicle from sun damage and excessive heat. The shade assembly includes a flexible protective screen adapted for substantially covering a window of the vehicle. An elongated roller carries the screen and includes an internal winding mechanism for automatically moving the screen from an extended in-use position to a retracted storage position around the roller. Mounting means are provided for mounting the roller proximate a first edge of the vehicle window. A pull cord is attached to an end of the screen and is adapted for extending from the first edge of the vehicle window to an opposing second edge of the vehicle window with the screen in the retracted storage position. An attachment clip is mounted to the vehicle proximate the second edge of the vehicle window for holding the pull cord. Upon pulling a free end of the pull cord in a direction towards the first edge of the vehicle window, the screen moves from the retracted storage position to the extended in-use position substantially covering the vehicle window.

According to one preferred embodiment of the invention, the mounting means includes an elongated housing with opposing end walls secured to respective opposing ends of the roller.

According to another preferred embodiment of the invention, the housing further includes opposing front and rear walls, a bottom wall, and a pivotably attached top wall adapted for movement between an open and closed position.

According to yet another preferred embodiment of the invention, an attachment strip is attached to the bottom wall of the housing and is adapted for mating with a complementary attachment strip attached to the vehicle for removably mounting the housing to the vehicle.

According to yet another preferred embodiment of the invention, the protective screen includes opposing inside and outside major surfaces. The outside major surface is formed of a sun-reflective material.

According to yet another preferred embodiment of the invention, the outside surface is formed of mylar.

According to yet another preferred embodiment of the invention, the inside major surface of the protective screen is formed of a fabric or plastic material.

According to yet another preferred embodiment of the invention, the protective screen has a lateral hem formed at its proximal end.

According to yet another preferred embodiment of the invention, a reinforcing slat is positioned within the hem.

According to yet another preferred embodiment of the invention, the attachment clip includes anchor means for releasably anchoring the pull cord to hold the screen in the extended in-use position substantially covering the window of the vehicle.

In another embodiment, the invention is a vehicle having a front windshield, a dash and a rearview mirror mounted proximate a top edge of the front windshield. The improvement in the vehicle includes a window shade assembly. The window shade assembly includes a flexible screen adapted for substantially covering the front windshield of the vehicle. An elongated roller carrying the screen and including an internal winding mechanism for automatically moving the screen from an extended in-use position to a retracted storage position around the roller. Mounting means are provided for mounting the roller on the dash of the vehicle proximate a bottom edge of the front windshield. A pull cord is attached to an end of the screen and is adapted for extending from the bottom edge of the front windshield to the top edge of the front windshield with the screen in the retracted storage position. An attachment clip is secured to the rearview mirror of the vehicle proximate the top edge of the front windshield for holding the pull cord. Upon pulling a free end of the pull cord downwardly in a direction towards the bottom edge of the front windshield, the screen moves from the retracted storage position to the extended in-use position substantially covering the front windshield.

A method according to the invention of protecting an interior of a vehicle from sun damage and excessive heat includes the steps of providing a flexible screen for substantially covering a front windshield of the vehicle. The screen is wound on an elongated roller having an internal winding mechanism for moving the screen from an extended in-use position to a retracted storage position around the roller. The roller is mounted to a dash of the vehicle proximate a bottom edge of the front windshield. A pull cord attached to an end of the screen extends from the bottom of the windshield to the top of the windshield with the screen in the retracted storage position. The pull cord is supported by an attachment clip secured to a rearview mirror mounted proximate a top edge of the front windshield. Upon pulling a free end of the pull cord downwardly in a direction towards the bottom edge of the front windshield, the screen moves from the retracted storage position to the extended in-use position substantially covering the front windshield.

BRIEF DESCRIPTION OF THE DRAWINGS

Some of the objects of the invention have been set forth above. Other objects and advantages of the invention will appear as the description proceeds when taken in conjunction with the following drawings, in which.

DESCRIPTION OF THE PREFERRED EMBODIMENT AND BEST MODE

Figure 1:
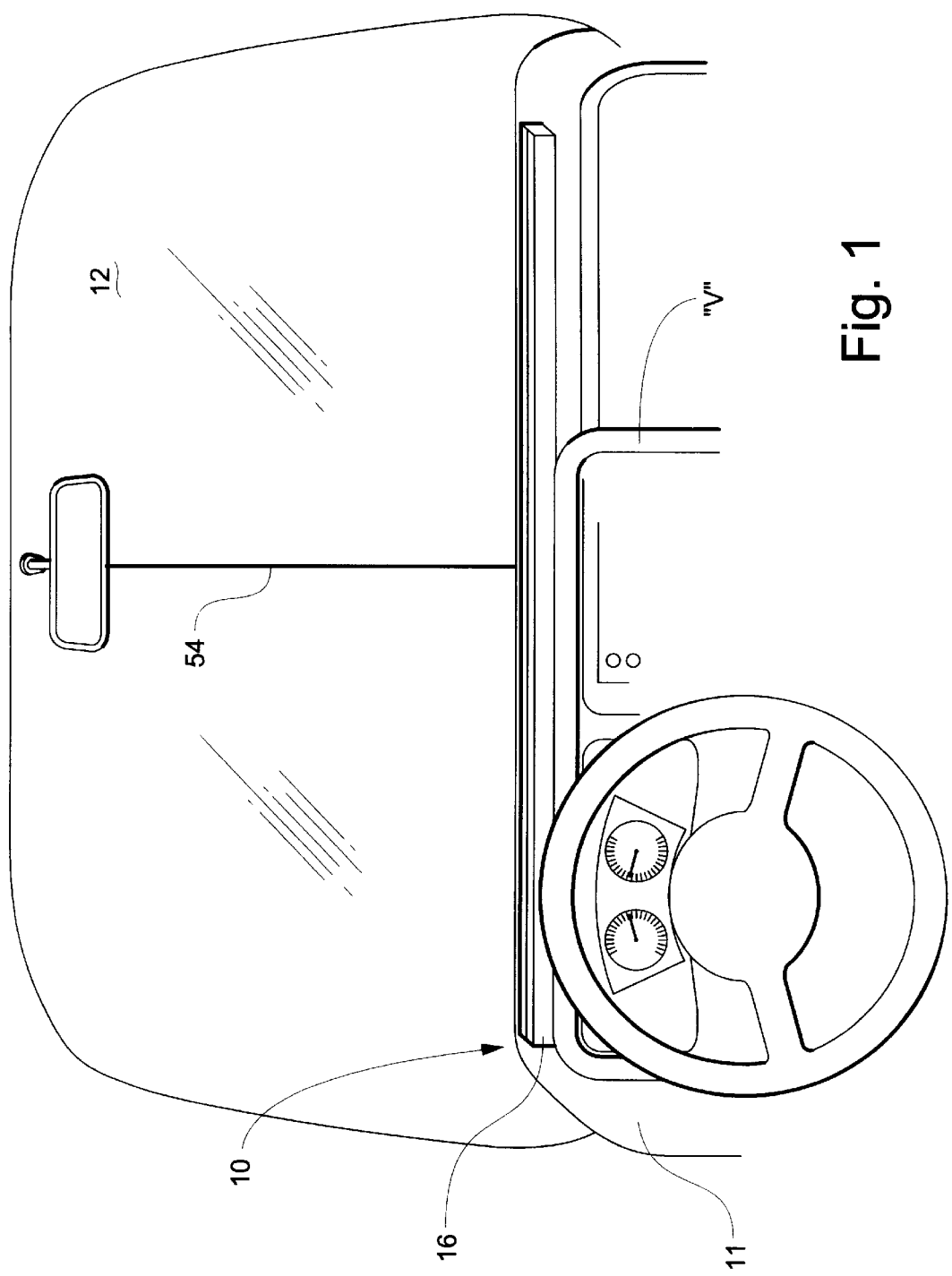
FIG. 1 is a perspective view of the vehicle window shade assembly mounted on the dash of a vehicle and showing the protective screen in the retracted storage position.
Figure 2:
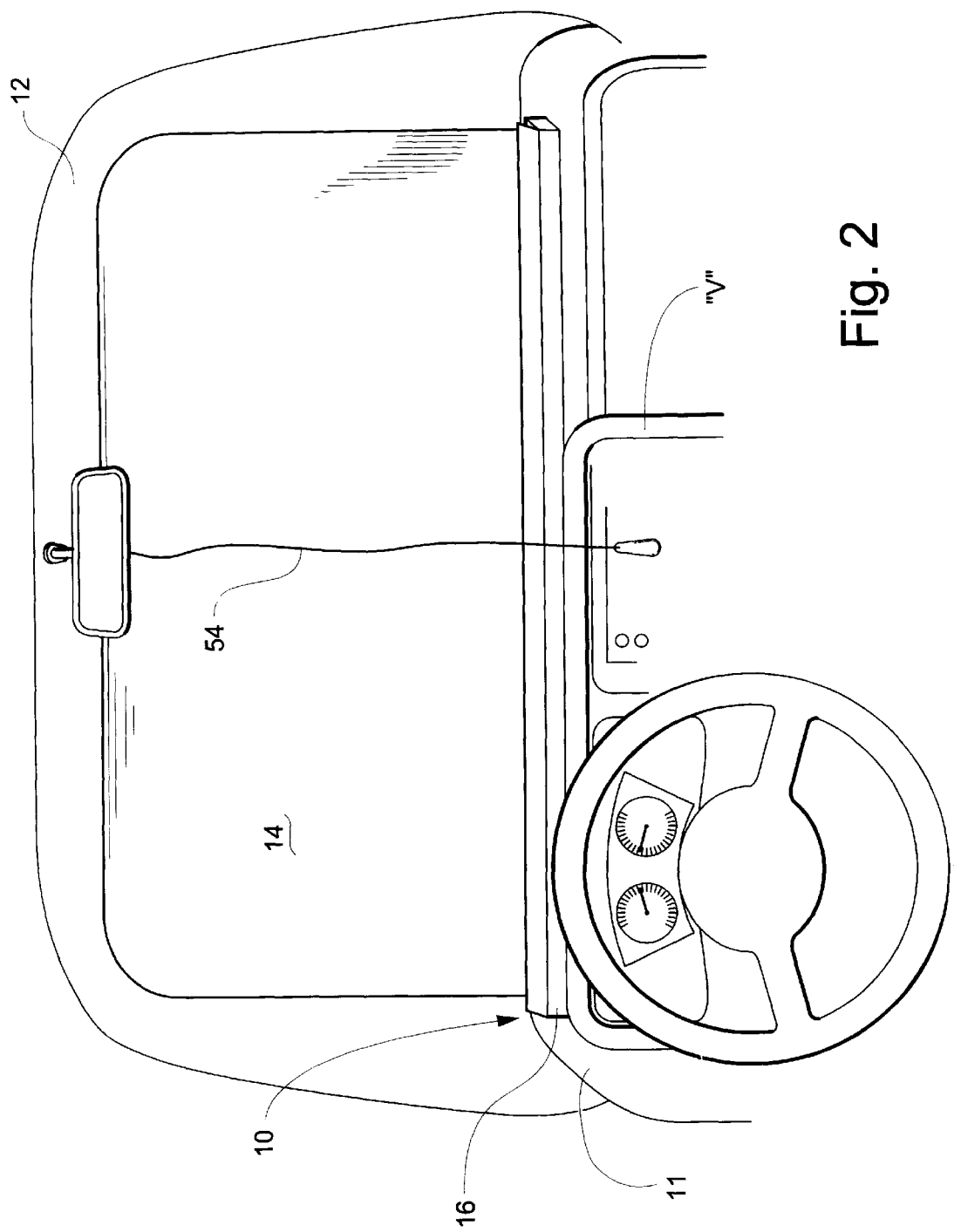
FIG. 2 is a perspective view of the vehicle window shade assembly mounted on the dash of a vehicle and showing the protective screen in the extended, in-use position.

Referring now specifically to the drawings, a vehicle window shade assembly according to the present invention is illustrated in FIG. 1 and shown generally at reference numeral 10. The shade assembly 10 is mounted on the dash 11 of the vehicle "V" adjacent the front windshield 12, and includes a flexible protective screen 14 shaped to substantially cover the windshield 12 when in the extended in-use position shown in FIG. 2. The shade assembly 10 is adapted for use in any vehicle "V", including automobiles and boats, to protect the interior of the vehicle from sun damage and excessive heat.

Figure 3:
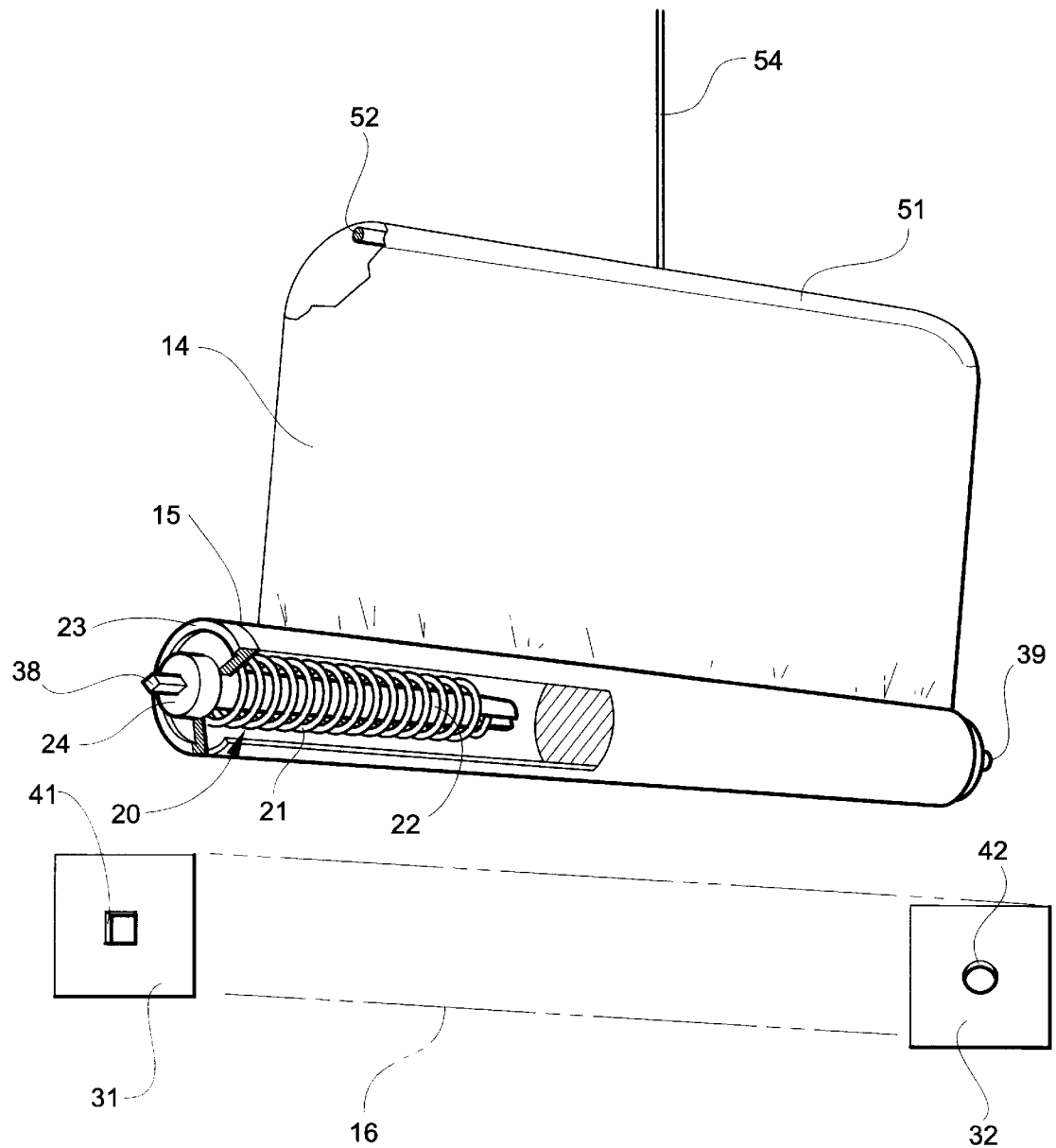
FIG. 3 is a perspective view of the shade roller and screen with surfaces broken away to illustrate hidden elements, and showing a portion of the shade housing in phantom.
Figure 4:
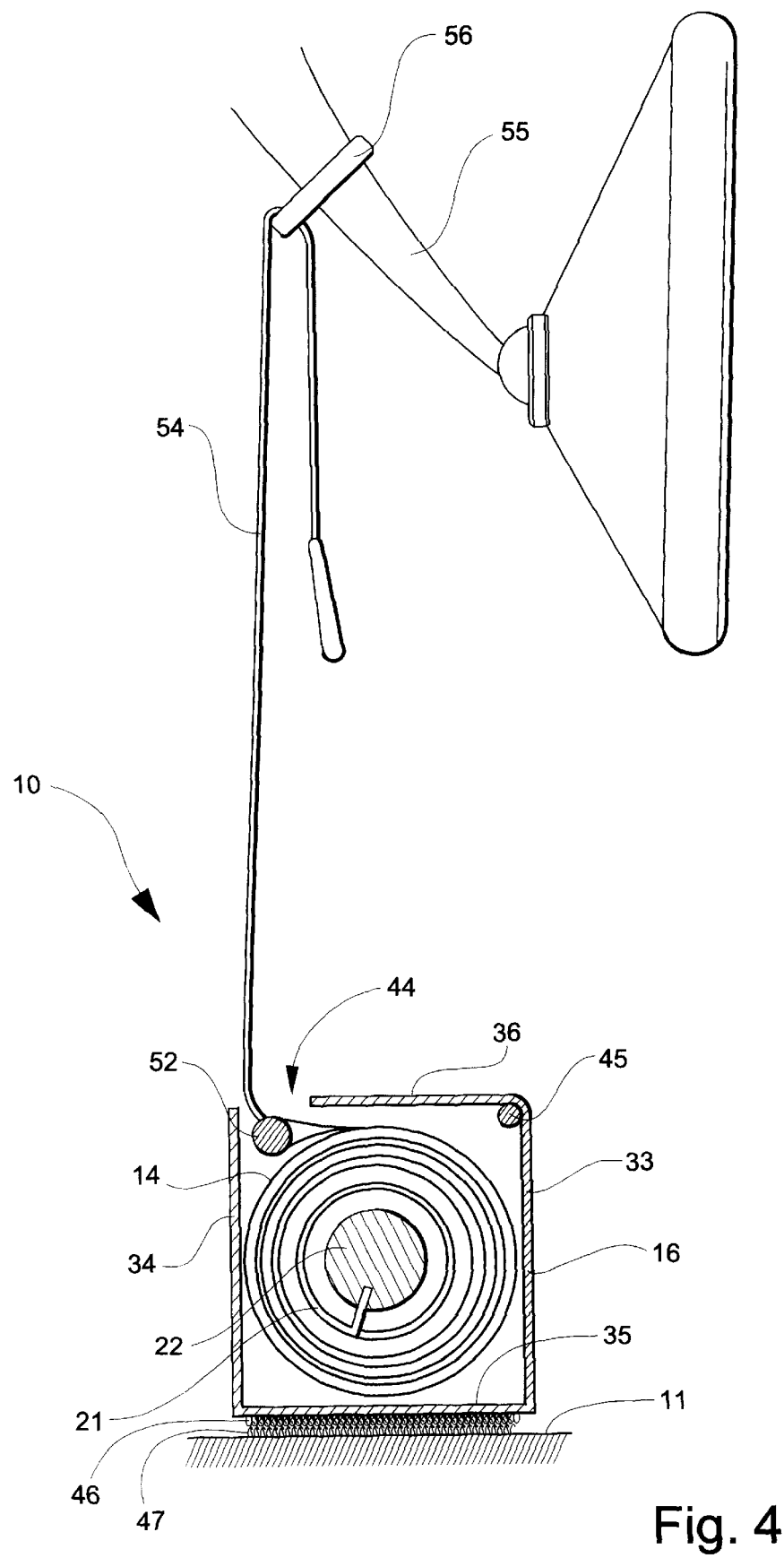
FIG. 4 is a side elevation of the vehicle window shade assembly showing the roller and roller housing in cross-section with the protective screen in the retracted storage position.

Referring to FIGS. 3 and 4, the flexible screen 14 is carried on a conventional shade roller 15 mounted for rotation within a roller housing 16. The shade roller 15 has an automatic internal winding mechanism 20 which operates in a conventional manner well known and understood in the art. The winding mechanism 20 includes a coil spring 21, support rod 22, pawl 23 and ratchet 24. The housing includes opposing end walls 31 and 32, opposing front and rear walls 33 and 34, a bottom wall 35, and a pivoted top wall 36. Flat and round end pins 38 and 39 extend from opposing ends of the roller 15 and are received through respective square and circular-shaped openings 41 and 42 formed in the end walls 31 and 32 to secure the roller 15 inside the housing 16. As shown in FIG. 4, adjacent spaced edges of the rear wall 34 and top wall 36 define a longitudinal slot 44 for accommodating passage of the screen 14 into and out of the housing 16. The opposing edge of the top wall 36 is hinged to the front wall 33 by, for example, a living hinge 45 or other suitable means. The top wall 36 pivots open when the screen 14 is moved to the extended in-use position shown in FIG. 2, and pivots closed when the screen 14 is returned to the retracted storage position within the housing 16, as shown in FIGS. 1 and 4. Preferably, a hook or loop fastener strip 46 is applied to the bottom wall 35 of the housing 16 and mates with a complementary hook or loop strip 47 applied to the dash 11 of the vehicle for removably mounting the housing 16 on the dash 11.

According to one embodiment, the protective screen 14 is a multiple layer laminate including an outside layer formed of a sun-reflective material, such as mylar, and an inside layer formed of a fabric material. Alternatively, the protective screen 14 may be a single layer of vinyl or cloth. A lateral hem 51 is formed along a top end of the screen 14 for receiving and holding a semi-rigid, reinforcing slat 52. A nylon pull cord 54 is attached to the slat 52 near the center of the screen 14, and is sufficiently long to extend from the housing 16 at the dash 11 of the vehicle to a rearview mirror 55 mounted adjacent a top edge of the front windshield 12.

Figure 5:
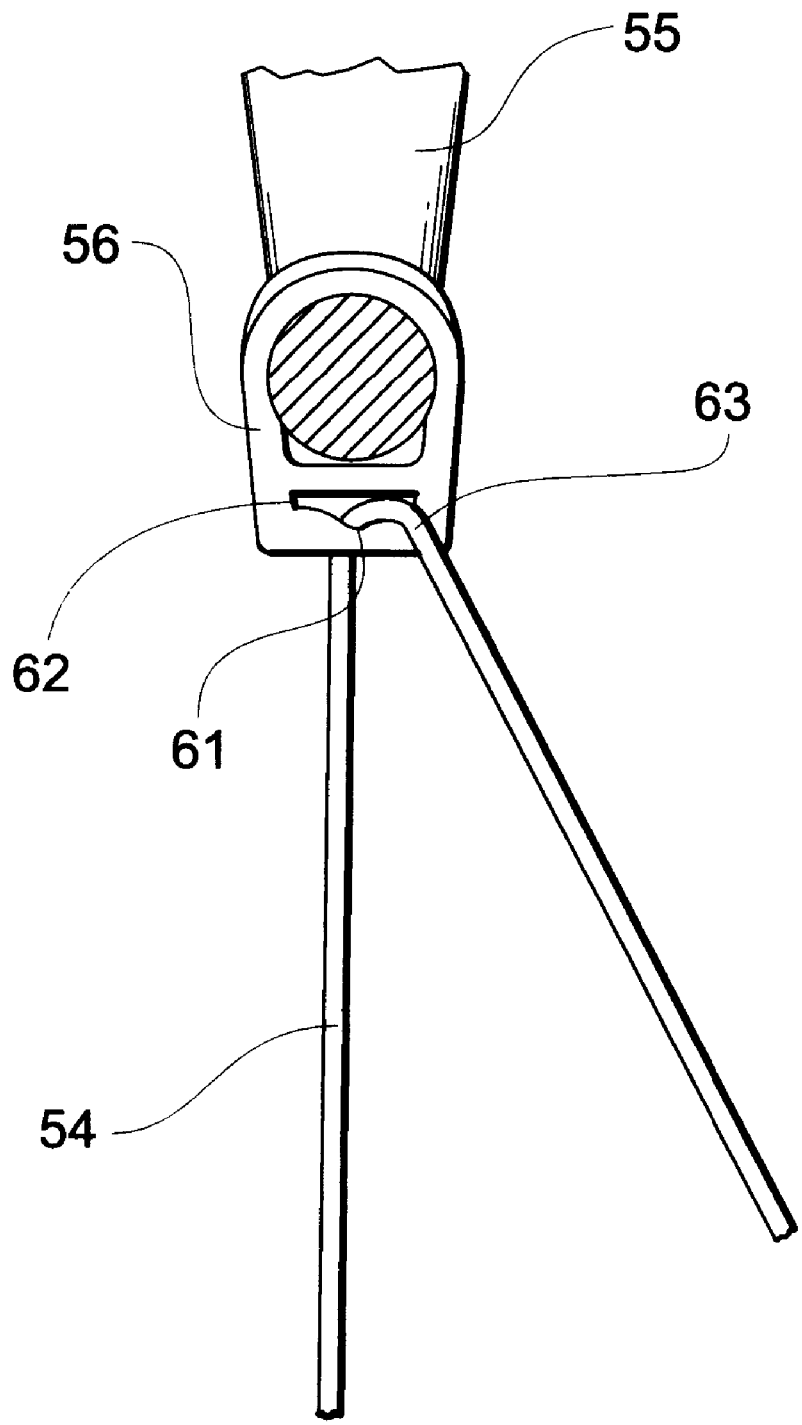
FIG. 5 is a view of the attachment clip fixed to the rearview mirror of the vehicle with the mounting arm of the mirror shown in cross-section.

Referring to FIGS. 4 and 5, an attachment clip 56 is fixed to the rearview mirror 55 for holding a free end of the pull cord 54 in position for convenient access by a user. As shown in FIG. 5, the attachment clip 56 has an enlarged center opening 61 slightly larger than the diameter of the pull cord 54, and opposing narrow anchor slots 62 and 63 formed to each side of the center opening 61. The anchor slots 62, 63 are adapted for frictionally engaging and holding the pull cord 54 to secure the protective screen 14 in the extended in-use position. The protective screen 14 is raised by the user by pulling the pull cord 54 downwardly towards the dash 11 of the vehicle. When moved to the desired height, the user pulls the cord 54 to one side of the clip 56 thereby wedging the cord 54 within the selected anchor slot 63 (See FIG. 5). To release the cord 54 from the anchor slot 63, the user pulls back towards the center of the clip 56 to reposition the cord within the enlarged center opening 61. The pull cord slides in the opening 61 as the protective screen 14 returns to its retracted storage position inside the housing 16.

A vehicle window shade assembly is described above. Various details of the invention may be changed without departing from its scope. Furthermore, the foregoing description of the preferred embodiment of the invention and the best mode for practicing the invention are provided for the purpose of illustration only and not for the purpose of limitation-the invention being defined by the claims.

I claim:

1. A vehicle window shade assembly for protecting the interior of a vehicle from sun damage and excessive heat, comprising:
   (a) a flexible protective screen adapted for substantially covering a window of the vehicle;
   (b) an elongated roller carrying said screen and comprising an internal winding mechanism for automatically moving said screen from an extended in-use position to a retracted storage position around said roller;
   (c) mounting means for mounting said roller proximate a first edge of the vehicle window;
   (d) a pull cord attached to an end of said screen and adapted for extending from the first edge of the vehicle window to an opposing second edge of the vehicle window with the screen in the retracted storage position; and (e) a rearview mirror attachment clip adapted for being secured to a support arm of a rearview mirror mounted to the vehicle proximate the second edge of the vehicle window and including an enlarged opening having a dimension larger than a diameter of said pull cord for allowing sliding movement of said pull cord therethrough, and a narrowed opening having a dimension less than the diameter of said pull cord for frictionally holding said pull cord in a fixed condition, whereby upon pulling a free end of said pull cord in a direction towards the first edge of the vehicle window, said pull cord slides through the enlarged opening of said attachment clip and said screen moves from the retracted storage position to the extended in-use position substantially covering the vehicle window, and upon moving said pull cord from the enlarged opening of said attachment clip to the narrowed opening of said attachment clip, said pull cords becomes secured in the fixed condition to hold said screen in the extended in-use position; and (f) said rearview mirror attachment clip further comprising an arm-receiving opening adapted for receiving the support arm of the rearview mirror.

2. A vehicle window shade assembly according to claim 1, wherein said mounting means comprises an elongated housing with opposing end walls secured to respective opposing ends of said roller.

3. A vehicle window shade assembly according to claim 2, wherein said housing further includes opposing front and rear walls, a bottom wall, and a pivotably attached top wall adapted for movement between an open and closed position.

4. A vehicle window shade assembly according to claim 3, and comprising an attachment strip attached to the bottom wall of said housing and adapted for mating with a complementary attachment strip attached to the vehicle for removably mounting the housing to the vehicle.

5. A vehicle window shade assembly according to claim 1, wherein said protective screen comprises opposing inside and outside major surfaces, said outside major surface being formed of a sun-reflective material.

6. A vehicle window shade assembly according to claim 5, wherein the inside major surface of said protective screen is formed of a fabric material.

7. A vehicle window shade assembly according to claim 1, wherein said protective screen comprises a lateral hem formed at a proximal end thereof.

8. A vehicle window shade assembly according to claim 7, and comprising a reinforcing slat positioned within said hem.

9. A vehicle window shade assembly according to claim 1, wherein said attachment clip includes anchor means for releasably anchoring said pull cord to hold the screen in the extended in-use position substantially covering the window of the vehicle.

10. In combination with a vehicle having a front windshield, a dash and a rearview mirror mounted on a support arm proximate a top edge of the front windshield, the improvement comprising a vehicle window shade assembly, comprising:

(a) a flexible screen adapted for substantially covering the front windshield of the vehicle;

(b) an elongated roller carrying said screen and comprising an internal winding mechanism for automatically moving said screen from an extended in-use position to a retracted storage position around said roller;

(c) mounting means for mounting said roller on the dash of said vehicle proximate a bottom edge of the front windshield;

(d) a pull cord attached to an end of said screen and adapted for extending from the bottom edge of the front windshield to the top edge of the front windshield with the screen in the retracted storage position; and (e) a rearview mirror attachment clip comprising means for securing said attachment clip to the support arm of the rearview mirror of said vehicle proximate the top edge of the front windshield for holding said pull cord, and an enlarged opening having a dimension larger than a diameter of said pull cord for allowing sliding movement of said pull cord therethrough, whereby upon pulling a free end of said pull cord downwardly in a direction towards the bottom edge of the front windshield, said screen moves from the retracted storage position to the extended in-use position substantially covering the front windshield.

11. A combination according to claim 10, wherein said mounting means comprises an elongated housing with opposing end walls secured to respective opposing ends of said roller.

12. A combination according to claim 11, wherein said housing further includes opposing front and rear walls and a pivotably attached top wall adapted for movement between an open and closed position.

13. A combination according to claim 10, wherein said protective screen comprises opposing inside and outside major surfaces, said outside major surface being formed of a sun-reflective material.

14. A combination according to claim 13, wherein the inside major surface of said protective screen is formed of a fabric material.

15. A combination according to claim 10, wherein said protective screen and comprises a lateral hem formed at a proximal end thereof.

16. A combination according to claim 15, and comprising a reinforcing slat positioned within said hem.

17. A combination according to claim 10, wherein said attachment clip includes anchor means for releasably anchoring said pull cord to hold the screen in the extended in-use position substantially covering the window of the vehicle.

* * * * *